Oct. 14, 1958     C. K. BAREFOOT     2,855,629
TIRE RETREADING APPARATUS
Filed June 10, 1955     2 Sheets-Sheet 1
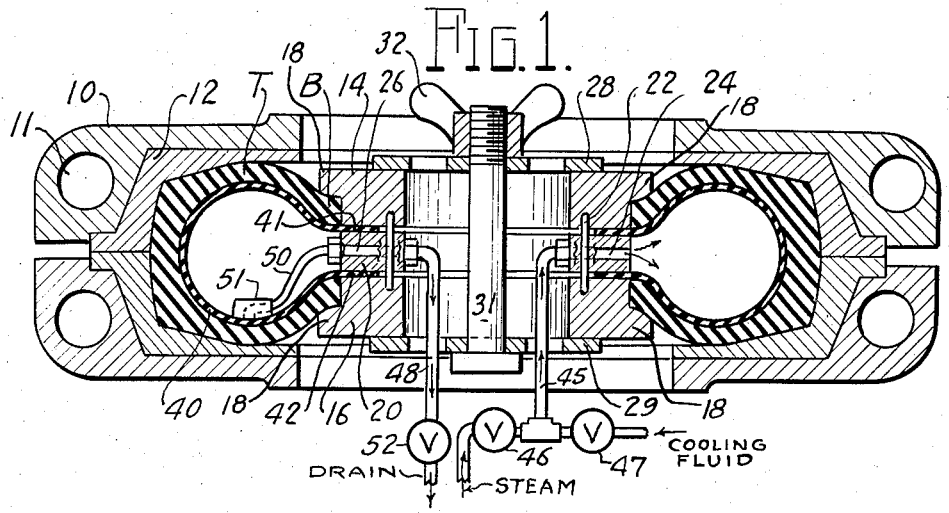
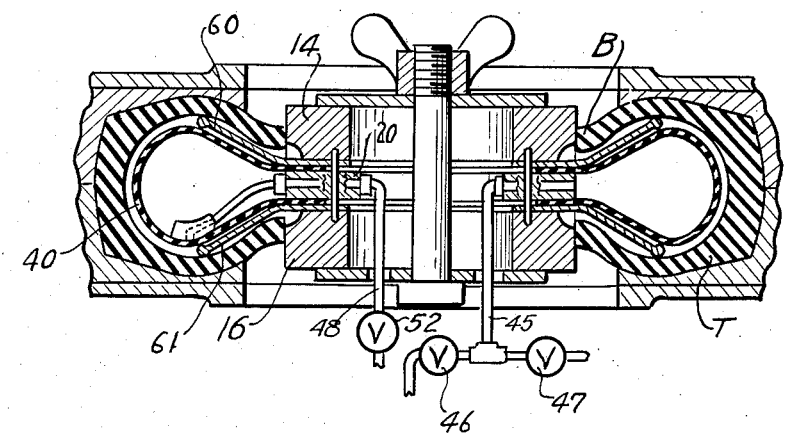
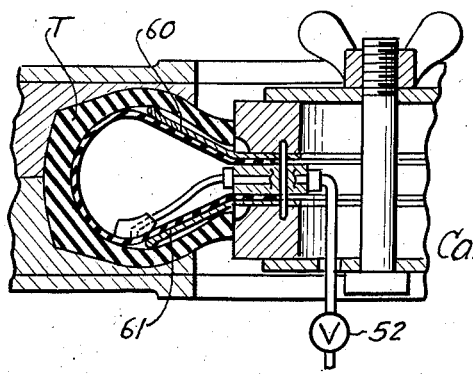
INVENTOR.
Carlton Keith Barefoot
BY
ATTORNEYS

United States Patent Office 2,855,629
Patented Oct. 14, 1958

2,855,629

TIRE RETREADING APPARATUS

Carlton Keith Barefoot, Muncie, Ind., assignor to National Industries, Inc., Muncie, Ind., a corporation of Indiana Application June 10, 1955, Serial No. 514,415

2 Claims. (Cl. 18—18)

This invention relates to the retreading of pneumatic vehicle tires and is particularly directed to an apparatus which not only simplifies and accelerates the retreading procedure but produces a better end product.

The primary object of the invention is to provide an improved tire retreading apparatus. It is another object to provide a tire retreading apparatus in which the curing of the retreading stock is accelerated by the introduction of heated fluid within the tire, but in which such fluid is contained within a sealed diaphragm. Therefore another object of the invention is to provide means to seal such a diaphragm without regard to whether a pressure tight seal is made around the tire itself.

Still another object of the invention is to provide an apparatus which will effectively prevent the entrapment of air between the diaphragm which contains heated fluid to accelerate the curing process and the interior of the tire.

Other objects and advantages of the invention will be apparent from the following specification which describes a preferred embodiment thereof, reference being had to the accompanying drawings in which—

Figure 1 is a somewhat diagrammatic vertical sectional view of a tire retreading apparatus constructed in accordance with the present invention;

Fig. 2 is a similar diagrammatic sectional view of a modified form of the invention showing the tire immediately after insertion in the mold and before the application of internal fluid pressure;

Fig. 3 is a fragmentary sectional view of the apparatus shown in Fig. 2 showing the position of the parts after the application of fluid pressure to the interior and thus during the curing process.

Figure 4:
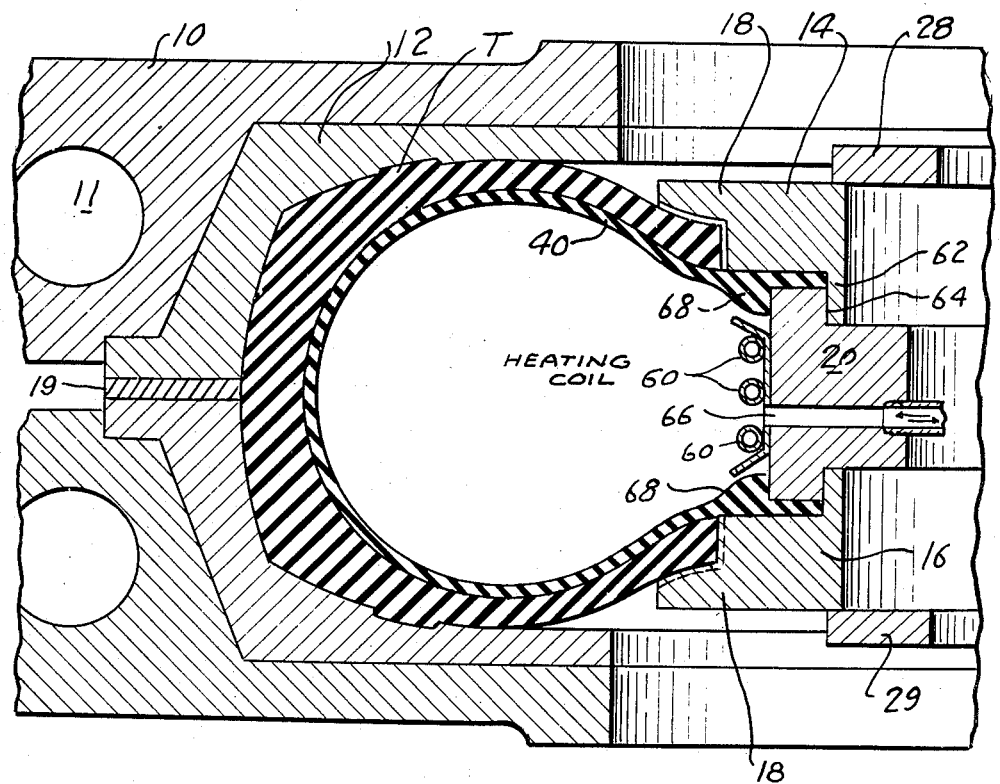
Fig. 4 is an enlarged fragmentary sectional view showing an additional modification of the invention.

Referring to the drawings, the essential elements of a tire retreading apparatus are shown, with most of the conventional parts such as supports, mold clamping and closing devices, etc., omitted since they form no part of the present invention. A mold 10 is provided as usual and is shown as being of the circumferentially split or "clamshell" type and heated by the application of steam in passages 11. It will be apparent that any suitable mold may be used, and that heating thereof may be accomplished in any known manner. Matrix sections 12 are seated in the mold and carry the tread design that will be imparted to the finished, retreaded tire.

A tire body is indicated at T, and it will be assumed that the body has been prepared for retreading by having its road engaging surface buffed down and a strip or band of new uncured tread stock applied thereto. The tire so prepared is mounted on a tire carrying means comprising, in the form shown opposed upper and lower annular plate or rim members 14 and 16. Each plate member is of a diameter that corresponds to the inner diameter of the tire so that it will engage easily against the inner face of the tire bead B, and has a flange 18 that engages over the outer face of the bead B. It is not necessary, and is in fact undesirable, that a sealing fit take place at or around the tire beads, so that precise dimensioning is not important.

One of the problems encountered in retreading tires is to assure that the tire body and the retreading stock fit closely in the mold in which curing is to be done. It is well known that, even though the mold is selected to match the nominal tire diameter, sufficient variation occurs in the actual size of the tire and applied rubber that the tire may be ruined unless proper precautions are taken to assure a proper fit. It is also well known that the adjustment of the periphery of the tire, that is its actual diameter, may be made by spreading or compressing the beads.

Prior art patents and publications show adjustable rims which engage the tire beads for the purpose of establishing a spacing between the beads which will result in that outside diameter of the tire which will correspond to the internal diameter of the mold in which curing is to take place. To select the proper adjustment for such a rim the operator measures the diameter of the tire with its applied rubber and then consults a chart which translates the measured diameter into terms of rim adjustment. He then follows the instructions derived from the chart in adjusting a number of internal spreading bolts, presumably to the same setting. If he adjusts the spreading bolts unequally, or fails properly to interpret the charted information the curing will proceed under faulty conditions, to the ruination of the tire.

The present invention minimizes the chances of maladjustment of the tire in the mold. A plurality or set of center sealing rings 20 are provided for insertion between the upper and lower clamping plates or rim members 14 and 16. The operator, as before, measures the tire and its applied new rubber to establish the actual diameter and, as before, consults a chart which translates the measured diameter into an indication of which of the set of rings 20 should be used to so spread or compress the beads as to result in a proper peripheral measurement that the tire will fit properly in the mold 10. When the sealing ring 20 has been selected it is located radially with respect to the upper and lower clamping plates by dowel pins 22. Each sealing ring is drilled to provide radial passages 24 for the admission of fluid and passages 26 for its removal. Appropriate spacer rings, matched to the set of center sealing rings 20 are provided for insertion between the matrix sections adjacent the tread portion of the tire. Such spacers are known in the art.

The assembly of the upper and lower tire engaging parts 14 and 16 and the center ring 20 is held together by a clamp. The clamp may take any desired form, but as shown in the drawings includes opposed upper and lower clamping plates 28 and 29, larger in diameter than the center opening of the tire engaging ring, and a clamping bolt 31 passed through the plates. One end of bolt 31 is headed over plate 29 while the other end receives a wing nut 32 which can be used to draw the assembly up into tight clamping engagement.

In most instances with which I am familiar, curing of a retreaded tire takes place under the influence of heat applied to the exterior only. In the case of new tires, however, the practice has been to introduce heated fluid into a bag or tube within the tire to accelerate the cure and it has been proposed to adapt this practice to the retreading field. The present invention substitutes a diaphragm having free edges for a continuous tube-like bag, and most important, so disposes the edges of the diaphragm that a fluid-tight seal is made entirely independent of the tire. To this end, a diaphragm 40 is provided, having a central loop portion and free edges that are designated 41 and 42 in the drawing. Diaphragm edge 41 is inserted between the upper plate or rim member 14 and the center sealing ring 20 and is, of course, clamped therebetween when the parts are drawn together by the bolt 31. Since the edge of the diaphragm that is so clamped is quite extensive in its radial dimension, a long fluid seal is made that is effective to prevent leakage even with a relatively light clamping pressure. Diaphragm edge 42 is similarly clamped between the lower plate or rim member 16 and the center sealing ring 20.

A fluid connection 45 is made to the inlet passage 24 in the center sealing ring 20 and is connected through a valve 46 to a source of heated fluid, such as steam as indicated in Fig. 1. A connection is also made through a valve 47 to a source of air or other cooling fluid under pressure. Valves 46 and 47 are operated successively in the curing cycle as hereinafter described.

A second fluid connection 48 is made to the discharge passage 26 in the center ring 20, at a point preferably diametrically opposite to the admission passage 24 to which connection 45 is made. A condensate drain member comprising simply a flexible tube 50 carrying an orifice block 51 is disposed within the diaphragm when the parts are assembled and a vent valve 52 controls the flow of fluid out of the connection 48.

In the operation of the form of the invention shown in Fig. 1, the tire to be retreaded is prepared in the usual manner. The tire is then mounted over the plate or rim members 14 and 16 which have previously been assembled with the selected center sealing ring 20 determined as above described. Prior to mounting the tire, the operator inserts the free edges of diaphragm 40 between the respective rim members and the sealing ring 20 so that when the tire is mounted on the rim the loop of the diaphragm will enter the cavity or interior of the tire. When the tire has been mounted, the operator clamps the parts in final position by drawing up on bolt 31 and by so doing clamps the diaphragm to form fluid tight seals at its edges. It will thus be seen that no attempt is made to seal against the tire beads and whether these parts are in close engagement with the rim members 14 and 16 makes little difference since these latter elements serve only a locating function. Any air that is trapped between the outside of the diaphragm and the interior of the tire can escape past the beads and, if desired, small serrations or grooves (such as 1/16" deep) may be provided in the face of the rim members against which the beads engage to facilitate this action.

The assembled tire and center elements 14, 16 and 20 are then placed in the mold 10 and the mold closed. Steam or other heated fluid is introduced into the mold passages 11, and simultaneously into pipe or connection 45 by the opening of valve 46. The diaphragm 40 is then expanded into intimate heat transfer relationship with the interior of the tire. Steam pressure is maintained within the tire during the entire curing period or during that portion thereof found most advantageous by the operator. Valve 52 may be opened occasionally by the operator to expel any condensate that may accumulate during the cure.

When the curing is deemed to have been completed by the operator it is important that the tire be cooled quickly and while in the mold to eliminate blow spots caused by the expansion of air or gas beneath the surface of the rubber when pressure is released from the outside. Cooling can be accomplished by passing air or cold water through the expanded diaphragm by opening valve 47 from the pressure source and the vent valve 52 so that the cooling medium can circulate either at atmospheric or an elevated pressure through the tire prior to its removal from the mold. The mold itself can be similarly cooled if desired by passing cold fluid through passages 11. The density and regularity of the applied tread material is thus maintained.

When cooling is complete the tire is removed from the mold and the center elements and diaphragm are removed from the tire.

In the form of the invention shown in Figs. 2 and 3 the tire engaging upper and lower rim elements 14 and 16 are modified to eliminate the bead engaging flanges 18. The tire beads are thus slightly spaced from the rim elements 14 and 16. Interior supporting plates 60 and 61 are inserted in the tire and have their peripheral free edges in light engagement with the interior of the tire and their center portions received between the rim elements and the center ring member. The diaphragm 40 is thus confined, for that area opposite the tire side walls, between the supporting plates 60 and 61. Fig. 2 shows the position of the parts prior to inflation of the diaphragm and Fig. 3 shows the parts after air or steam pressure has been introduced into the assembly. After inflation the diaphragm 40 forces the tire firmly against the matrix or mold and curing proceeds under pressure. When the tire is cured, cooling fluid is introduced into the diaphragm as described above. This form of the invention has the advantage that any air trapped between the outside of the diaphragm and the interior of the tire can escape more easily from around the outer wall of the supporting plates and past the beads of the tire. While air can escape past the tire beads in the form shown in Fig. 1, its passage is somewhat impeded by the clamping effect of the flanges 18 although no deliberate seal is made at this point and in fact the sealing tendency can be eliminated by grooving the flanges 18 as previously described.

The operation of the modification shown in Figs. 2 and 3 is similar to that above described in connection with Fig. 1. The interior supporting plates 60 and 61 constitute what is known in the art as an "inside curing rim." Such devices have as their prime advantage that the beads of the tire are unconfined and are free to assume whatever position is necessary to assure a perfect fit of the tread portion of the tire in the mold. In prior instances with which I am familiar where such devices have been used, no provision for adjustment has been made, and a tubular air bag has been employed. With the present invention, the use of the center sealing ring 20 makes it possible to accommodate tires having varying axial dimensions and also makes it possible to use the diaphragm 40. It is required that the ends of the plate 60 and 61 clear the interior of the mold or matrix by a definite dimension so that it is obvious that molds for thicker tires will require that the thickness of the spacing and sealing plate 20 be increased.

Fig. 4 shows somewhat diagrammatically an additional modification of the invention. In the forms above described heat to the interior of the tire has been supplied from a source of steam which is introduced into the tire for the purpose of transmitting heat by direct conduction from the steam itself to the diaphragm and thence to the body of the tire. In the form shown in Fig. 4 heat is supplied to the interior of the tire by radiation from heating elements or coils 60 fixed to the external periphery of the center sealing ring 20. The coils 60 may be energized either electrically or, if convenient, the coils may be made hollow for the passage of steam therethrough. In either event the heat is radiated therefrom to the opposite wall of the diaphragm and tire and suitable thermostatic controls may be used in a known manner to limit the highest temperature attained by the interior of the assembly.

The modification in Fig. 4 is also different from that shown in Fig. 1 by the elimination of the locating dowel pins 22 and the substitution therefor of a depending flange or rim 62 in the outer clamping plates which seats behind a shoulder 64 formed on the center sealing ring. This method of locating the center sealing ring with respect to the clamping rings is somewhat simpler because it disregards the peripheral location of the parts which is required in the modification shown in Fig. 1 and substitutes therefor only the proper radial location of the center sealing ring with respect to the clamping plates.

As in the modification shown in Fig. 1 the form shown in Fig. 4 includes radial passages 66 through which cooling fluid may be injected into and drained from the interior of the tire to cool the same after the heating portion of the retreading cycle is completed in the mold.

Fig. 4 also illustrates a preferred form of diaphragm 40. The diaphragm is preferably molded with a ledge or extension 68 adjacent each side and spaced from the ultimate edge of the diaphragm by a short distance so that the extension beyond the ledge 68 serves as the clamping portion of the diaphragm that is received between the center sealing ring 20 and the upper and lower clamping plates 14 and 16. The ledge 68 at the top and bottom seats against the center sealing ring and serves to locate the diaphragm with respect thereto. In this manner the operator is assured of the diaphragm being properly located and having the necessary amount of surface available for clamping at the top and bottom to establish the proper seal with respect to the interior of the diaphragm.

While certain modifications of the invention have been shown and described it should be expressly understood that various other modifications and changes may be made without departing from the spirit and scope of the appended claims.

What I claim is:

1. Tire vulcanizing apparatus comprising in combination, opposed, relatively movable annular members adapted to engage a tire adjacent the open center portion thereof, a separable central sealing ring disposed between said members, a diaphragm adapted to engage the interior wall surface of a tire engaged by said opposed members and having its side walls extending outwardly from the open center portion of the tire, said diaphragm having a wall interposed on opposite sides of said sealing ring, spaced annular supporting plates disposed on each side of said sealing ring and extending into engagement with the interior of the tire at points remote from the point of engagement of the tire with said first annular members, means to clamp said first annular members, said diaphragm and said supporting plates together and thereby seal the periphery and interior of said diaphragm while the interior of said tire outside said diaphragm remains unsealed, and means to inject fluid through said sealing ring into the interior of said sealed diaphragm.

2. The combination defined in claim 1 in which the point of contact of said supporting plates lies between the bead portions of the tire and a point on the tire interior opposite the tread wall thereof.

References Cited in the file of this patent

UNITED STATES PATENTS

| | | |
|---|---|---|
| 2,031,561 | Day | Feb. 18, 1936 |
| 2,335,878 | Oren | Dec. 7, 1943 |
| 2,435,466 | Thomas | Feb. 3, 1948 |
| 2,495,664 | Soderquist | Jan. 24, 1950 |
| 2,530,055 | Green | Nov. 14, 1950 |
| 2,677,854 | Andreini | May 11, 1954 |
| 2,710,424 | Kraft | June 14, 1955 |
| 2,734,225 | Glynn | Feb. 14, 1956 |